3,382,171
METHOD FOR CONTROLLING SLIME IN
AN AQUEOUS SYSTEM WITH A SILVER
FLUOROMETALATE
Dorsey R. Mussell, Clare, and Theodore W. Holmsen, Midland, Mich., assignors to The Dow Chemical Company, Midland, Mich., a corporation of Delaware
No Drawing. Filed Oct. 1, 1965, Ser. No. 492,329
7 Claims. (Cl. 210—62)

ABSTRACT OF THE DISCLOSURE

A method for the control of slime in aqueous systems involving contacting slime-forming organisms and their habitats in the aqueous systems with a silver fluorometalate compound.

The present invention is concerned with slime control. Slime consists of certain biological organisms, many of them microscopic; accumulations caused by such organisms; and organic matter. The resulting deposits, called slime, are of varying characteristics, ranging from stringy, pasty, and gelatinous, to hard and horny.

The development of slime consistitutes a major problem wherever moisture is present, but particularly in bodies of water. For example, in industrial applications, circulating water systems are subject to slime formation. The development of slime is also a problem in cooling towers. Similarly, air conditioning units typically require the useage of a body of water which is subject to slime growth. The development of slime is also a problem in swimming pools, in water reservoirs, in water-purifying systems, and even in natural bodies of water used for navigational purposes or for swimming and other recreational purposes.

The development of slime in any site is generally undesirable. The mass which it, in a short time, forms, reduces the effective diameter of pipes and other members in circulating systems. Wherever the body of water in which the slime develops is itself involved in the production of some substance—such as in the production of paper in the paper industry—the presence of slime will contaminate the product, coloring it, giving it an odor, and typically reducing its strength. The development of slime frequently reduces the efficiency of a body of water being employed industrially; for example, in cooling towers and air conditioning units, the growth of slime on portions thereof reduces severely the efficiency of the tower or unit to dispel heat. In such situations, the development of slime requires frequent removal, a costly and time-consuming operation. In addition, the presence of slime, particularly in bodies of water employed for recreational purposes, is aesthetically objectionable. For these and other reasons, the prevention of the development of slime is of great importance.

The biological organisms most typically involved in the development of slime are algae, bacteria, and fungi. The most notorious slime-producing members of such groups are those which secrete a gelatinous material surrounding the cells as a capsule or sheath. Such organisms thereby produce materials which contribute significantly to the bulk of the resulting slime. Moreover, such secretion has the effect of embedding the organism, thereby making it more resistant to control.

While the particular organisms present in the development of slime vary greatly from location to location, and even at a given location, from time to time, representative slime-forming organisms include: Aspergillus spp.; Penicilium spp.; Candida spp.; Saccharomyces spp.; Aerobacter spp.; Escherichia spp.; Alcaligenes spp.; and Bacillus spp. Yet other organisms involved in slime development include: Chlorella spp.; Spyrogyra spp.; Oscillatoria spp.; Vaucheria spp.; Pseudomonas spp.; Salmonella spp.; Staphylococcus spp.; Pullularia spp.; and Rhizopus spp.

The present invention is directed to improved methods for slime control. These methods employ a silver fluorometalate of the formula

$$Ag_mX$$

wherein X represents tetrafluoroborate, hexafluorosilicate, hexafluorophosphate, hexafluoroarsenate, or hexafluoroantimonate; and $m$ represents an integer equal to the value of the valence of X. The methods of the present invention have the advantage of uniform activity and persistance over a long period of time.

In the present specification and claims, the term "silver fluorometalate" is employed to designate only a material of the above definition. Thus, the active agent to be employed in acordance with the present invention is one of the following: silver tetrafluoroborate; silver hexafluorosilicate; silver hexafluorophosphate; silver hexafluoroarsenate; and silver hexafluoroantimonate. These compounds are crystalline solid materials, typically of low solubility in organic materials and of low to moderate solubility in water. In the present specification and claims, the term "aqueous system" is employed to designate all bodies of essentially aqueous nature, including natural bodies of water, such as lakes; industrial aqueous bodies, such as cooling water systems, water itself employed in industrial processes, and the like; bodies of water used for home and recreational purposes, such as swimming pools; and irrigation canals; and the like.

The method of the present invention for controlling slime in an aqueous system comprises adding to the aqueous system a slimicidal amount of one or more of the silver fluorometalate materials. The term "slimicidal" is employed to designate an amount of one or more of the silver fluorometalate compounds which kills, inhibits the growth of, or prevents the growth of, the slime-producing organisms.

The amount of silver fluorometalate compound which is slimicidal varies with the particular organisms present in a given body of water, the method of application of the silver fluorometalate, and the nature and the amount of other additaments present. The amount varies, moreover, with the degree to which the silver fluorometalate is gradually removed from the aqueous system and with the frequency of treatment. An amount which will provide from 0.1 to 50 or more parts of silver fluorometalate by weight per million parts of aqueous medium is usually desirable. The upper limit is dictated primarily by economic considerations; generally a concentration in excess of 500 parts by weight per million offers no advantage.

The method of the present invention can be carried out with an unmodified silver fluorometalate compound, inasmuch as at low concentrations, the silver fluorometalate compounds are soluble in water. However, the silver fluorometalate can also be employed in the form of a composition. Such composition can contain, in addition to the active material, one or more adjuvants, which can be surface-active dispersing and solubilizing agents, stabilizers, binders, inert finely divided solids, or solvents or other liquid carriers. Depending upon the concentration of silver fluoromethylate compound and the particular manner in which the invention is to be practiced, such compositions can be employed directly as the treating composition to be added to the aqueous system or can be employed as concentrate compositions and further diluted to produce the treating composition.

The preferred adjuvant is a surface-active dispersing agent, generally present in an amount of from 0.5 to 20 percent by weight of the composition.

Suitable surface-active dispersing agents include the alkyl aryl sulfonates, sulfate and sulfonate fatty acid amides, polymerized sodium salts of alkyl naphthalene and benzene sulfonic acids, and the ammonium salt of monoethylphenyl phenol sulfonates, as well as sodium and potassium salts of sulfonated esters of dicarboxylic acids and sulfated fatty esters. Such composition can, of course, in additon, be modified by one or more stabilizers, binders, inert powders, liquid carriers, or moistening agents. When the composition is a liquid, suitable liquid carriers include organic solvents such as acetone, alcohols, and water.

When the method of the present invention is carried out with a liquid composition, an unmodified silver fluorometalate, or a solid composition intended to be essentially soluble, the composition or unmodified active agent can be applied to the aqueous system to be treated by simple addition at any portion thereof. Where the aqueous system represents a larger body of water, it is preferable that the addition be followed by agitation to effect mixing of the composition with the aqueous system. In the instance of a circulating system, it is preferred that the method be carried out by metered addition, especially at a site of turbulence which has the effect of uniformly dispersing the silver fluorometalate material.

Where the treating composition is a solid designed to remain for at least a period of time in such state, it is preferable that portions of such composition be spaced throughout the aqueous system, if large and of limited circulation, to facilitate treating all portions thereof with a slimicidal amount of silver fluorometalate. In the instance of a circulating system, adequate treatment is usually obtained by exposing the circulating water to the solid at one location.

The following examples illustrate the best method now known for the practice of the present invention, and will enable those skilled in the art to employ the present invention.

EXAMPLE 1

The silver fluorometalate materials to be employed in accordance with the present invention were employed for the control of Chlorella spp. In these operations, a Chlorella culture was prepared by growing the organism on an organic nutrient solution under conditions of aeration and light of high intensity. No attempt was made to keep the culture pure, and it was known to be contaminated by unidentified bacteria and protozoa.

In the evaluations, ten milliliter aliquots of the Chlorella culture were placed in separate vials. Thereafter, an aqueous solution of each of the compounds to be evaluated was added to each of a separate series of four of the vials, such that in the front vial, the concentration of subject compound was 10 parts per million (p.p.m.); in the second vial, 5 p.p.m.; in a third vial, 2 p.p.m.; and in the fourth vial, 1 p.p.m. An additional series of four vials was left untreated to serve as a control group. All of the vials were then covered with a pcakaging film of polymerized vinylidene chloride, to minimize evaporation, and maintained, with aeration, under conditions of light of high intensity and room temperatures. One week following the intiation of the evaluation, the vials were examined. In all vials containing one of the subject compounds, inhibition of the growth of slime was noted. The results of the observations, expressed as the concentration of subject compound necessary to obtain 100 percent control of Chlorella, are set forth in the following table.

| Compound evaluated: | P.p.m. giving 100% control of Chlorella |
|---|---|
| Silver tertafluoroborate | 5 |
| Silver hexafluorophosphate | 5 |
| Silver hexafluoroarsenate | 1 |
| Silver hexafluoroantimonate | 10 |
| Silver hexafluorosilicate | 2 |

At the time of the observations, the vials of the control group were found to sustain rampant growths of Chlorella.

EXAMPLE 2

The silver fluorometalate materials of the present invention were further evaluated for the control of Vaucheria, an algal organism which forms slime on the walls of swimming pools and water reservoirs. A Vaucheria culture was prepared by the same procedure employed in the preparation of the Chlorella culture of Example 1.

As in Example 1, the Vaucheria culture was pipetted into vials, aqueous solutions of each material to be evaluated added separately at different concentrations to each of four vials, and the resulting preparations held for a period of time under conditions favorable to the growth of the organism. In the instance of Vaucheria, the vials were placed in an apparatus which, by movement of the individual vials thereon, provided for aeration for the test mixtures. The vials were held under light of high intensity varying from 1200 to 1600 F.C.

The vials were examined one week later to determine the lowest concentration of compound being evaluated necessary to give 100 percent control of Vaucheria. The results are as set forth in the following table.

| Compound evaluated: | P.p.m. giving 100% control of Vaucheria |
|---|---|
| Silver tetrafluoroborate | 5 |
| Silver hexafluorophosphate | 5 |
| Silver hexafluoroarsenate | 5 |
| Silver hexafluoroantimonate | 2 |
| Silver hexafluorosilicate | 1 |

Examination of the vials of the control group showed a heavy growth of Vaucheria upon the inner surface of the vials as well as in the solution in the vials.

EXAMPLE 3

The procedures employed in Example 2 were repeated except that the organism against which the subject compounds were evaluated was Spyrogyra, an algal organism which constitutes a major problem in water purification by clogging filters and imparting an undesirable taste and odor to the water.

The procedures of Example 2 were modified in that fine gravel was provided in the Spyrogyra culture, as well as in all vials employed in the evaluation procedures, to duplicate the natural conditions favorable to Spyrogyra growth. The results of the evaluations are set forth in the following table.

| Compound evaluated: | P.p.m. giving 100% control of Spyrogyra |
|---|---|
| Silver tetrafluoroborate | 5 |
| Silver hexafluorophosphate | 5 |
| Silver hexafluoroarsenate | 1 |
| Silver hexafluoroantimonate | 1 |
| Silver hexafluorosilicate | 1 |

Control vials were found to have a heavy growth of Spyrogyra on the gravel provided as well as in the solutions in the vials.

EXAMPLE 4

Two of the silver fluorometalates of the present invention were evaluated for the control of slime in synthetic cooling water. The synthetic cooling water was prepared by adding to deionized water sufficient $CaCl_2 \cdot 6H_2O$ and $MgCl_2 \cdot 6H_2O$ to obtain 2000 parts per million hardness. In addition, a commercial nutrient broth was added, at the rate of 2 milliliters of broth per liter of ultimate composition, to provide the nutrition typically found in cooling water. Finally, the composition was adjusted with dilute NaOH to a pH of $7 \pm 0.1$.

The synthetic cooling water thus prepared was placed in a plurality of flasks, and each flask inoculated with a mixed inoculum of the following representative slime-forming organisms: *Aerobacter aerogenes*; *Pseudomonas aeruginosa*; *Aspergillus niger*; and *Bacillus mycoides*. The flasks, uncovered, were gently agitated for approximately twenty-four hours. Thereafter, portions of silver tetrafluoroborate were placed in half of the flasks in amounts sufficient to create varying concentrations, and portions of silver hexafluorophosphate were placed in the other half of the flasks, similarly in amounts sufficient to create varying concentrations.

At twenty-four and forty-eight hour intervals following addition of the subject compounds, samples of all of the flasks were separately streaked on nutrient agar plates, and the streaked plates held under standard conditions for a period of time sufficient to develop growth of any slime-forming organisms present. At the end of this period, all plates were examined and rated according to degree of growth.

Rating was made on the basis of the following scale:

1. Sterile
2. Slight growth
3. Moderate growth
4. Heavy growth
5. Rampant growth The results were as set forth in the following table:

| Compound evaluated | Concentration of compound evaluated in parts per million | Rating 24 hours | Rating 48 hours |
|---|---|---|---|
| Silver tetrafluoroborate | 100 | 2 | 2 |
| Silver hexafluorophosphate | 100 | 2 | 2 |
| Silver tetrafluoroborate | 75 | 3 | 2 |
| Silver hexafluorophosphate | 75 | 3 | 2 |
| Control | | 5 | 5 |

EXAMPLE 5

Silver hexafluoroarsenate is employed for the control of slime in so-called "white" water, the water removed from paper stock as it is deposited on wire in the process of paper manufacture. The white water has a pH of 6.5.

A composition comprising silver hexafluoroarsenate and a surface-active dispersing agent, in an amount representing 10 percent by weight of the composition, is added to various portions of the white water to obtain, correspondingly, concentrations of 50, 100 and 300 parts of silver hexafluoroarsenate per million parts by weight of treated white water. The resulting treated white water is then allowed to stand for 48 hours at 30° C. At the end of this period, equal aliquot portions of the treated samples are plated on tryptone glucose extract agar and the plates incubated for 48 hours at 30° C. A check operation is carried out wherein untreated white water is incubated and an exactly equal aliquot plated in a similar manner as previously described.

Following the incubation period, the plates are examined to determine any effect of the treating with silver hexafluoroarsenate. In plates representing the control, high bacterial counts are observed, whereas in the plates representing the treated white water, the bacterial counts are negligible.

We claim:

1. Method for controlling slime in an aqueous system which comprises contacting slime-forming organisms and their habitats in the aqueous system with a slimicidal amount of a silver fluorometalate of the formula $$Ag_mX$$

wherein X represents tetrafluoroborate, hexafluorosilicate, hexafluorophosphate, or hexafluoroarsenate; and $m$ represents an integer equal to the value of the valence of X.

2. Method of claim 1 wherein the silver fluorometalate compound is employed in an amount such that it is present in the aqueous system in a concentration of from 0.1 to 500 parts of silver fluorometalate per million parts by weight of ultimate aqueous system.

3. Method of claim 2 wherein the silver fluorometalate is silver tetrafluoroborate.

4. Method of claim 2 wherein the silver fluorometalate is silver hexafluorophosphate.

5. Method of claim 2 wherein the silver fluorometalate is employed in the aqueous system as a composition comprising the silver fluorometalate and a surface-active dispersing agent.

6. Method of claim 5 wherein the silver fluorometalate is silver tetrafluoroborate.

7. Method of claim 5 wherein the silver fluorometalate is silver hexafluorophosphate.

References Cited

UNITED STATES PATENTS

| 2,853,449 | 9/1958 | Moudry et al. | 210—64 |
| 2,913,505 | 11/1959 | Van Raay et al. | 260—677 |
| 3,189,428 | 6/1965 | Mussell | 23—88 X |
| 3,189,658 | 6/1965 | Quinn | 260—677 X |
| 3,230,137 | 1/1966 | Ellison | 162—161 |

MICHAEL E. ROGERS, *Primary Examiner.*